US005953802A

United States Patent [19]
Radzio

[11] Patent Number: 5,953,802
[45] Date of Patent: Sep. 21, 1999

[54] WINDSHIELD REMOVAL JACK

[76] Inventor: Matthew D. Radzio, 39 Copley St., Rochester, N.Y. 14611

[21] Appl. No.: 09/024,727

[22] Filed: Feb. 17, 1998

[51] Int. Cl.⁶ .................................................. B25B 11/00
[52] U.S. Cl. ............................ 29/239; 29/256; 29/281.5; 254/100; 254/DIG. 2
[58] Field of Search .............................. 254/98, 100, 101, 254/133, DIG. 2; 269/95, 21, 904; 29/256, 281.1, 281.5, 239

[56] References Cited

U.S. PATENT DOCUMENTS

| 502,200 | 7/1893 | Pearson | 254/101 |
|---|---|---|---|
| 886,956 | 5/1908 | De France | 254/101 |
| 1,457,633 | 6/1923 | Kubovcik | 254/98 |
| 4,291,866 | 9/1981 | Petersen | 269/95 |
| 4,817,977 | 4/1989 | Bookbinder | 254/DIG. 2 |
| 4,991,807 | 2/1991 | Radnich | 269/904 |
| 4,998,711 | 3/1991 | Borg | 269/95 |
| 5,085,415 | 2/1992 | Shaver | 269/904 |
| 5,297,779 | 3/1994 | Collins et al. | 254/98 |

*Primary Examiner*—Robert C. Watson
*Attorney, Agent, or Firm*—Robert J. Bird

[57] ABSTRACT

A windshield jack includes a linear actuator operable between retracted and extended conditions. The actuator includes telescoping inner and outer tubes. A reversible drive motor connected to the outer tube includes a threaded drive shaft which engages a the inner tube, a base member for positioning on the front seat of a vehicle, and a windshield contact member to engage the windshield. Motor rotation in one direction moves the inner tube to extend the actuator. Motor rotation in the opposite direction moves the inner tube to retract the actuator. The base member may be a straight crossbar, a foot pad, or a bowed crossbar. The windshield contact member may be a crossbar, a suction cup, or a crossbar with suction cups along it.

3 Claims, 7 Drawing Sheets

WINDSHIELD REMOVAL JACK

FIELD OF THE INVENTION

This invention is a mechanized jack to assist in removal of motor vehicle windshields for replacement.

BACKGROUND OF THE INVENTION

Removal of a windshield requires cutting the seal which surrounds the windshield. Automotive windshields are usually sloped, making it difficult or even impossible to move a cutting tool along the inner bottom edge of the windshield. The procedure now generally followed is to cut the seal along the top and sides of the windshield, then to push and hold the top of the windshield forward to make the bottom edge accessible. This pushing and holding is done by means of the worker's head, shoulder, or arm while he cuts the bottom seal with one or two free hands. The procedure is stressful on the neck, back or arm. It can, and does, cause injury and permanent damage.

In addition to the technique discussed above, the most relevant prior art that I know of is U.S. Pat. No. 5,479,689 to Schmit et al. It discloses a tool for separating the windshield from the body of the vehicle. The tool includes a pair of jaws for placement between windshield and body, and a ratchet and pawl mechansm somewhat similar to that of a caulking gun to expand or retract the spacing of the jaws.

This invention provides a better way to push and hold a windshield forward to make its bottom edge accessible.

SUMMARY OF THE INVENTION

A windshield jack according to this invention includes a linear actuator operable between retracted and extended conditions. The actuator includes telescoping inner and outer tubes. A reversible drive motor connected to the outer tube includes a threaded drive shaft extending into engagement the inner tube, a base member to be positioned on the front seat of a vehicle, and a windshield contact member to engage the windshield. Motor rotation in one direction drives the inner tube to extend the actuator. Motor rotation in the opposite direction drives the inner tube to retract the actuator. The base member may be a simple crossbar, a foot pad, or a bowed crossbar. The windshield contact member may be a simple crossbar, a suction cup, or a crossbar with suction cups along it.

DRAWING

DESCRIPTION

Figure 1:
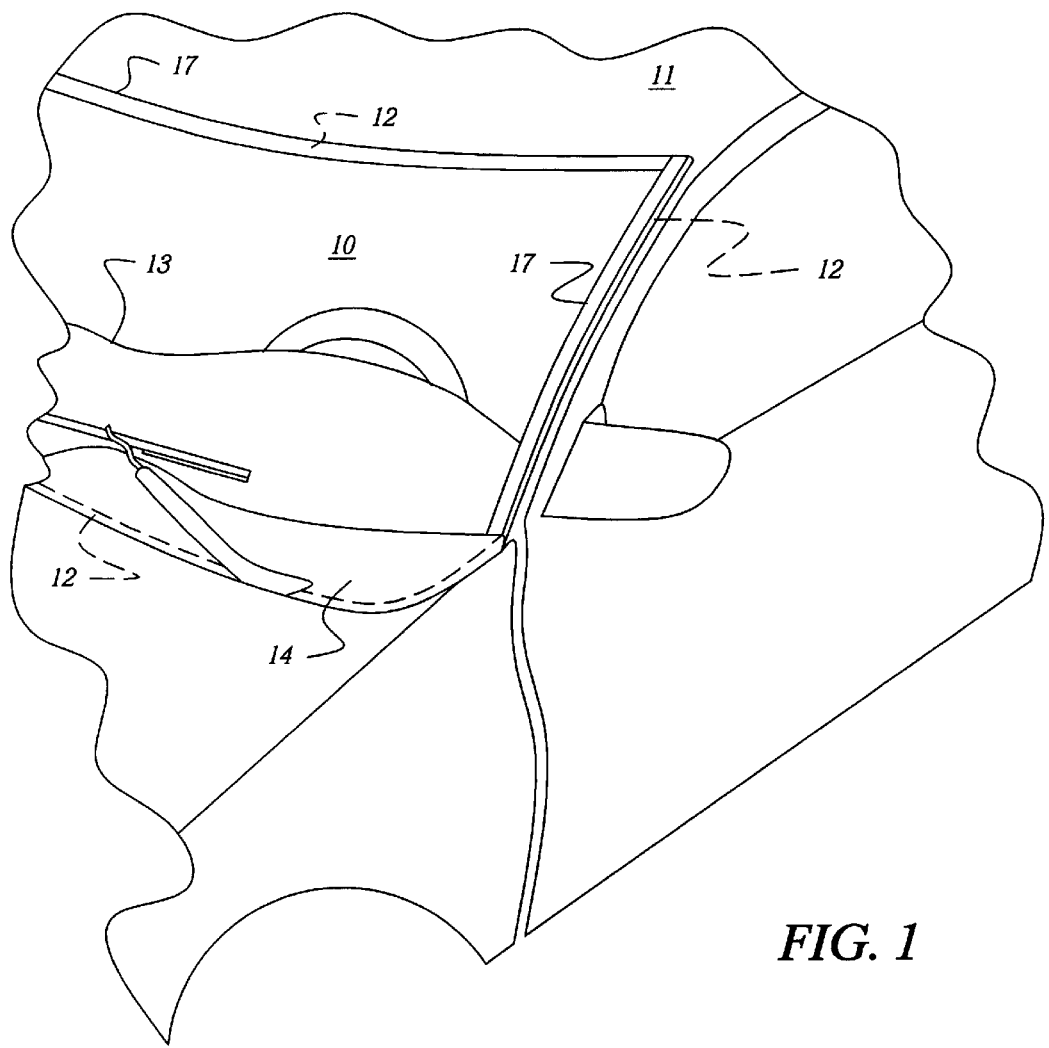
FIG. 1 is a partial pictorial view of the left front of an automobile.

The automobile in FIG. 1 includes a windshield 10 mounted on an automobile body 11 and secured to the body by means of a seal 12 (which is invisible behind molding 17 on the top and sides of the windshield). The windshield is sloped, and its bottom edge extends down below a dashboard 13 on the inside, and under a cowl 14 on the outside. With the windshield 10 thus mounted, its bottom edge is quite inaccessible.

Figure 2:
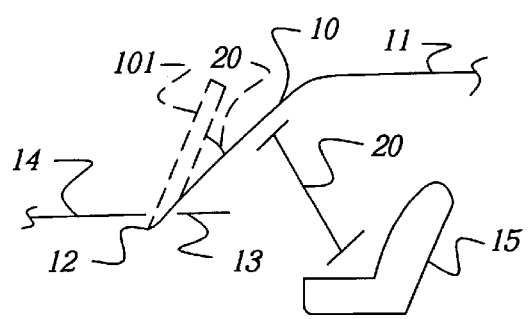
FIG. 2 represents a side view of the front interior of an automobile.

FIG. 2 represents a side interior view of the automobile. The windshield 10 is shown in solid line in its normal position relative to the frame 11. The phantom line 101 represents the position of the windshield pushed forward of the dashboard 13, in which position the bottom edge seal 12 is accessible for cutting. A windshield jack 20 is positioned between the windshield 10 and the front seat 15 of the car. A windshield jack 20 is a linear actuator, expandable from a retracted condition (solid lines) to an extended condition (phantom lines) to push the windshield forward.

Figure 3:
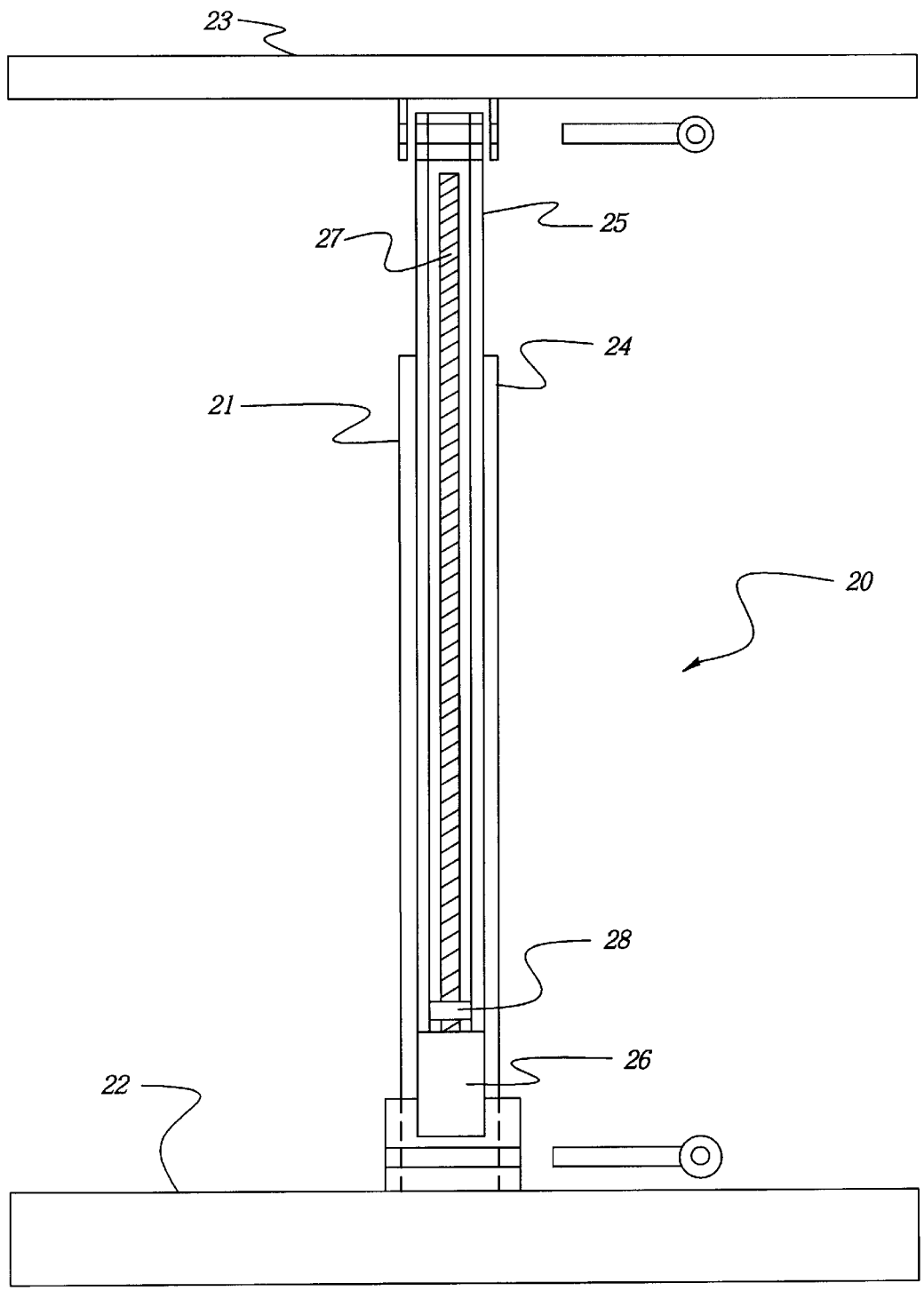
FIG. 3 shows one form of windshield jack according to this invention.
Figure 4:
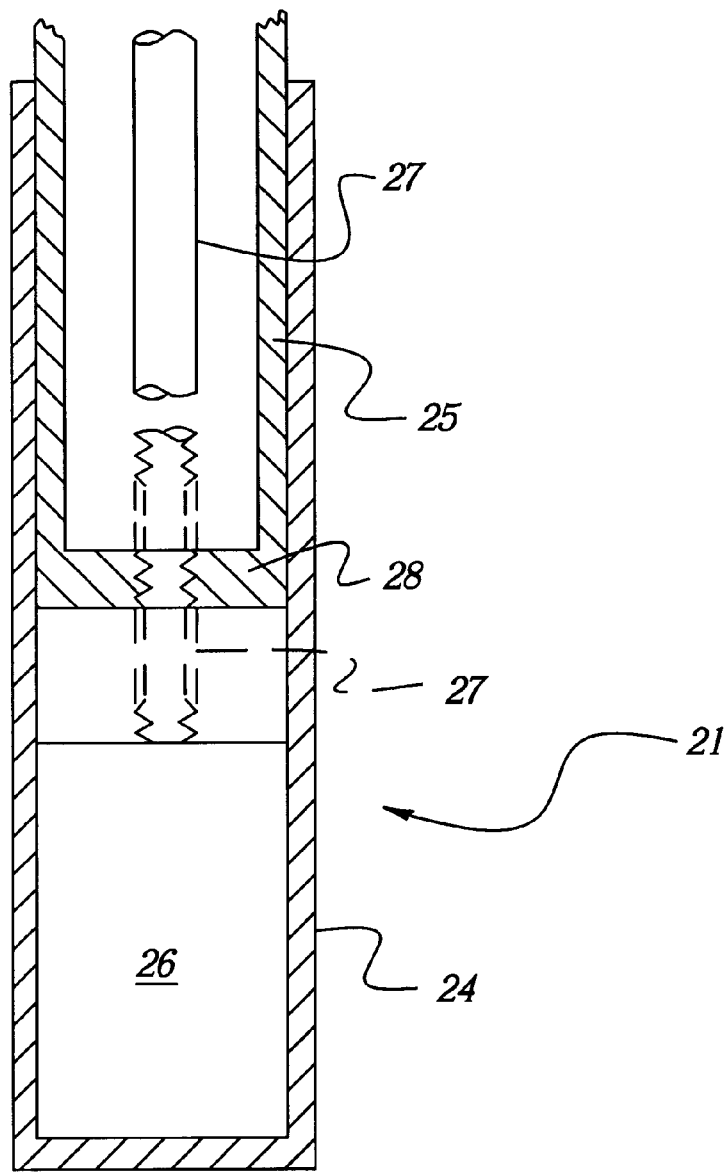
FIG. 4 is an enlarged view of part of the device of FIG. 3.

FIGS. 3 and 4 show one form of the windshield jack 20. It includes a linear actuator 21 with a pivotally mounted base 22 on the bottom end, and a pivotally mounted windshield contact member 23 on the top end. The base 22 is a straight crossbar to be supported on the car seat 15. The contact member 23 is a crossbar. The actuator 21 includes an elongated outer tube 24 and an elongated inner tube 25, the tubes being axially movable relative to each other. A reversible drive motor 26 is mounted in the bottom of the outer tube 24. A threaded drive shaft 27 extends up from the motor 26 into threaded engagement with the bottom 28 of the inner tube 25. The drive shaft extends through the bottom 28 and up into the interior of the tube 25. The tubes 24, 25 are square in cross section to prevent their relative rotation. Rotation of the motor 26 in one direction drives the inner tube 25 upward to expand the actuator 21. Motor rotation in the opposite direction retracts the inner tube 25.

Figure 5:
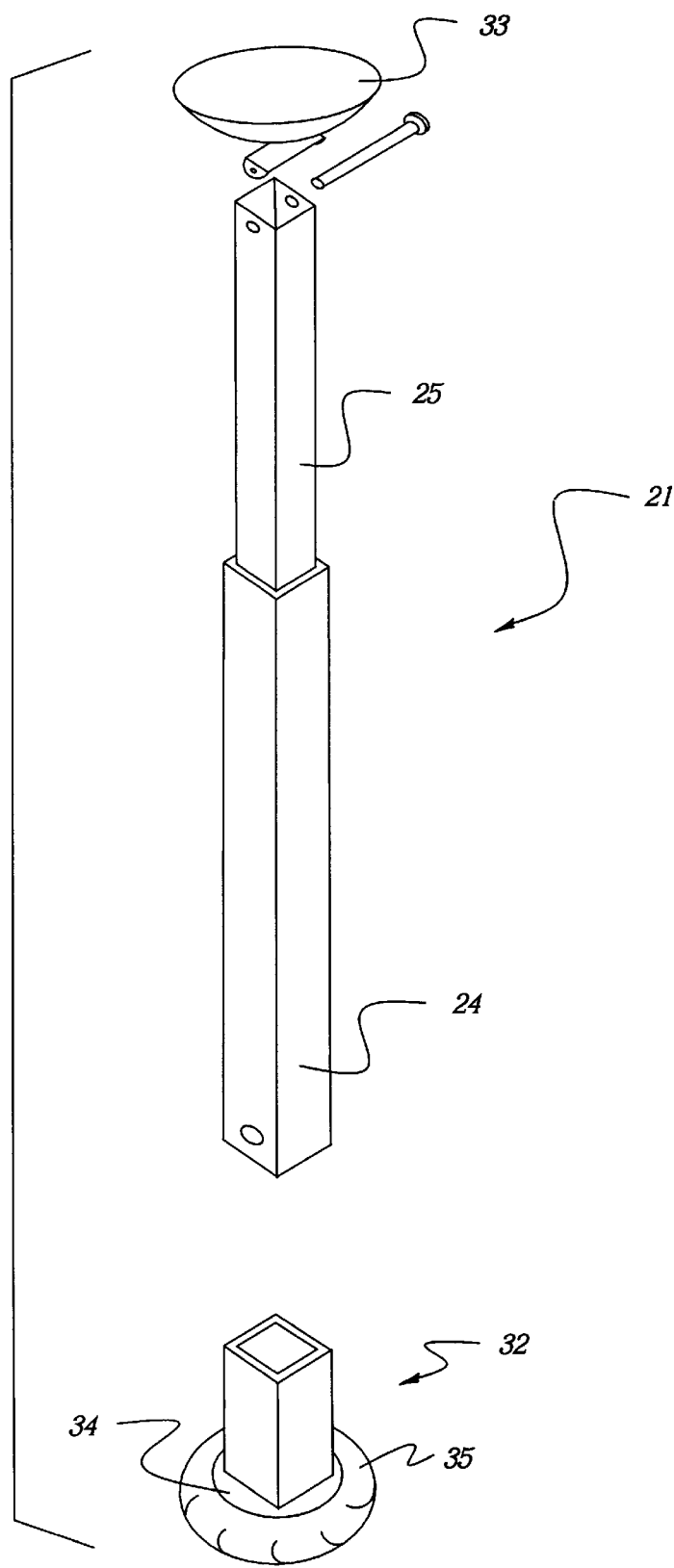
FIG. 5 is an exploded view of my windshield jack in another form.

FIG. 5 shows another form of the windshield jack It includes a linear actuator 21 as described in connection with FIGS. 3 and 4, with pivotally mounted base and windshield contact members 32 and 33. The base 32 includes a foot pad 34 with a soft or resilient cover 35 for placement on the car seat 15. The contact member 33 is a suction cup.

Figure 6:
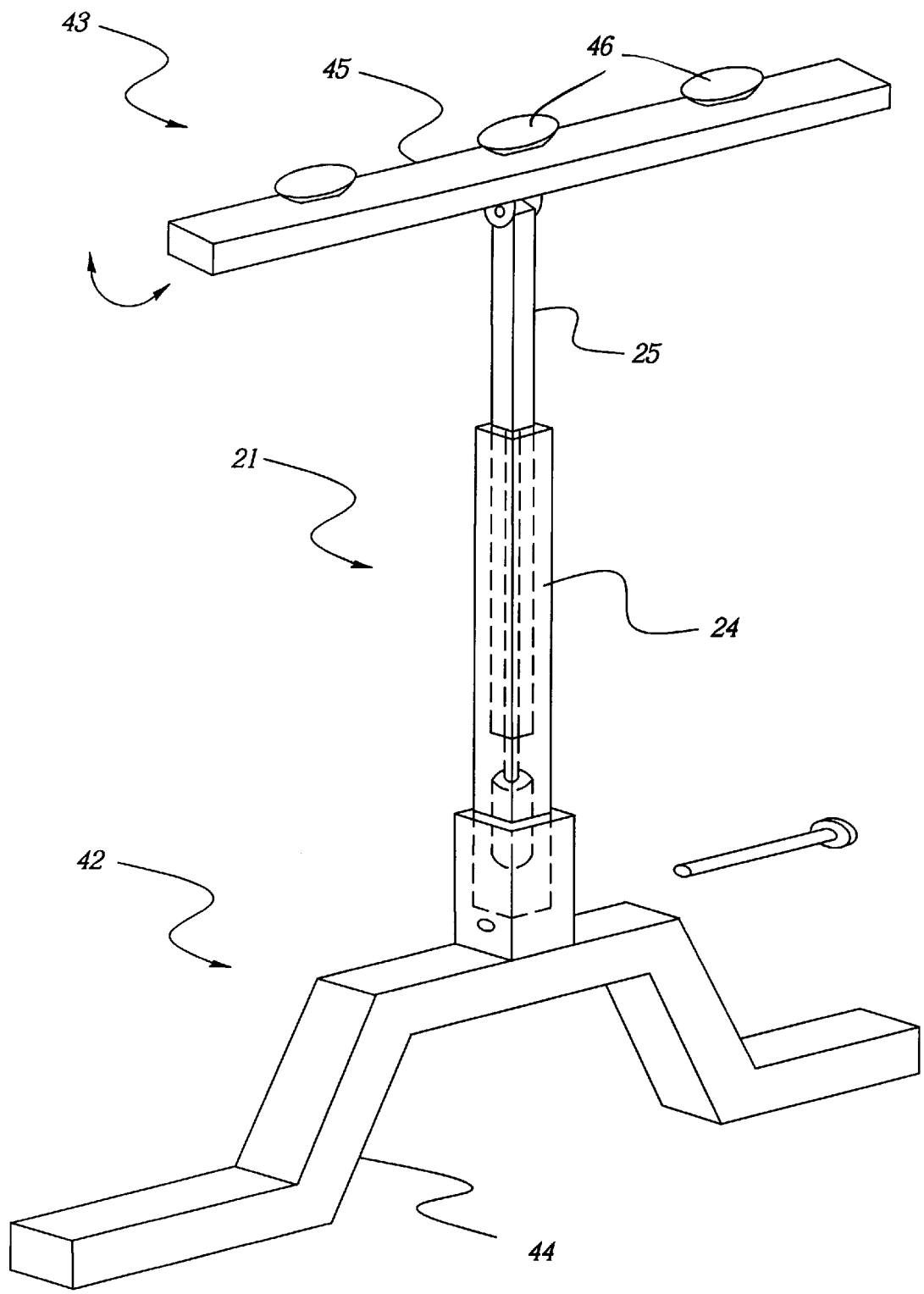
FIG. 6 shows my windshield jack in still another form.

FIG. 6 shows another form of the windshield jack. It includes a linear actuator 21 as previously described, with a base 42 and a pivotally mounted windshield contact member 43. The base 42 includes a bowed crossbar 44 for placement on car front seats 15, the bowed configuration permitting the crossbar to bridge a console 16 between the seats. The contact member 43 includes a crossbar 45 with a number of suction cups 46 along its length.

Figure 7:
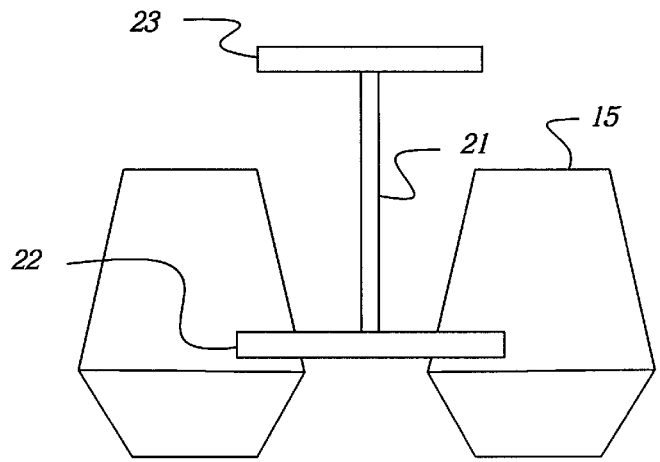
FIGS. 7, 8, 9 are views, looking rearward from the dashboard, to illustrate the mounting of my jack on various car seat configurations.
Figure 8:
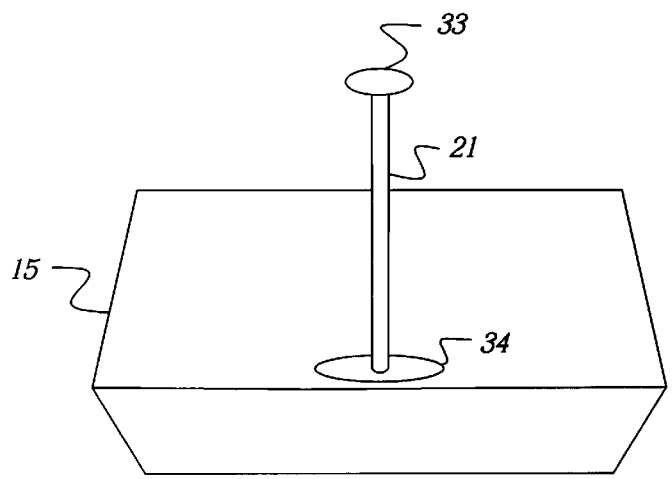
Figure 9:
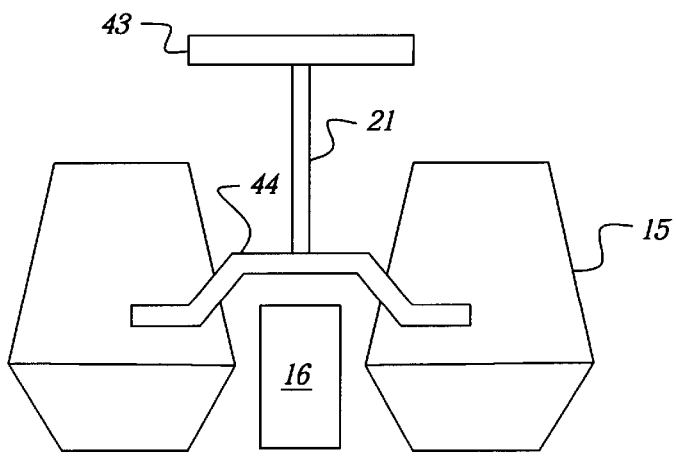

FIGS. 7, 8, 9 illustrate the placement of my windshield jack on various car seat configurations.

FIG. 7 illustrates placement of the device shown and described in connection with FIG. 3, in which the lower crossbar 22 is placed on the car seat 15, with the upper crossbar 23 directed at the windshield.

FIG. 8 shows placement of the device of FIG. 5, in which the foot pad 34 is placed on the car seat 15, with the suction cup 33 directed at the windshield.

FIG. 9 shows placement of the device of FIG. 6, in which the bowed crossbar 44 is placed on the car seat 15, straddling the center console 16, with the upper crossbar 45 directed at the windshield.

The bases 22, 32, 42 and windshield contact members 23, 33, 43 described above are removably attached to the actuator 21, and interchangeable, making the windshield jack usable in vehicles of different configurations.

Figure 10:
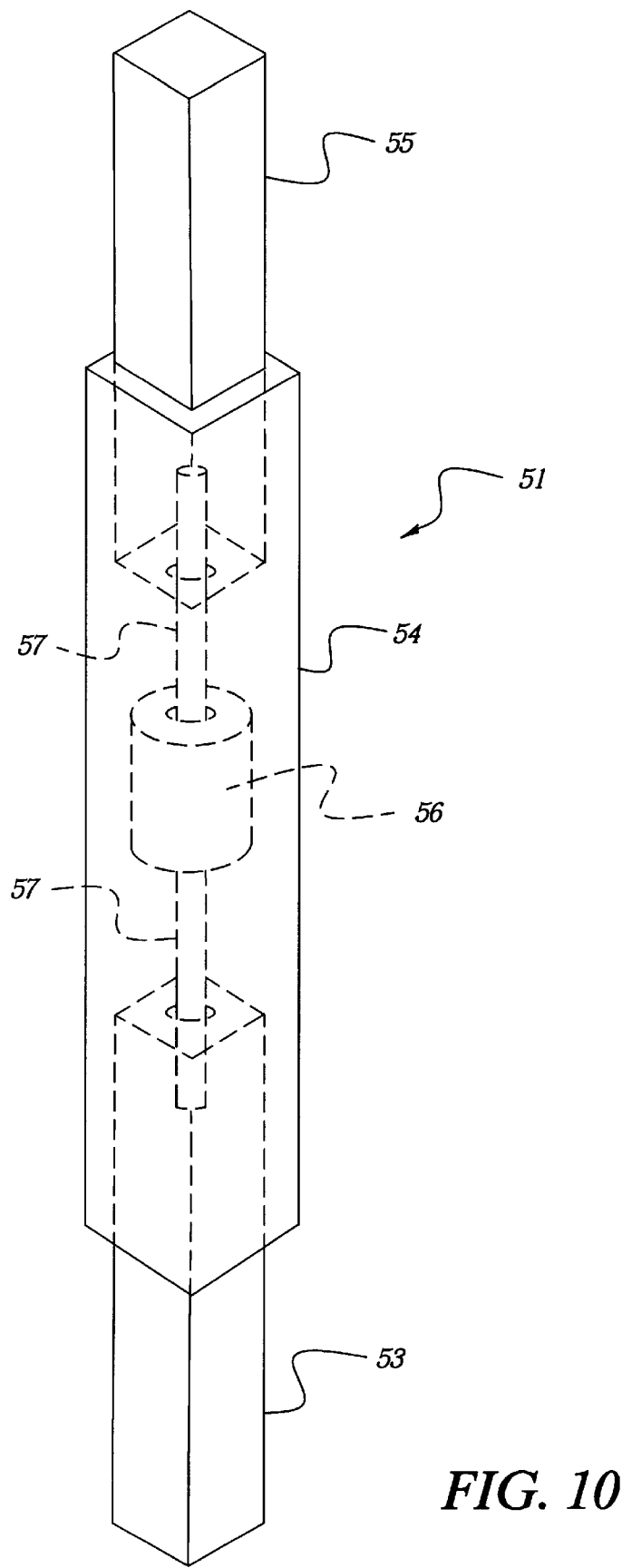
FIG. 10 shows another form of my jack.

FIG. 10 shows another form of my jack. In this form, a linear actuator 51 includes an elongated outer tube 54, a reversible drive motor 56 mounted at a central location within it, and a pair of elongated inner tubes 53, 55 extending one from each end of the outer tube 54 and axially movable relative to it. The tubes 53, 54, 55 are square in cross section to prevent their relative rotation. The inner tubes 53, 55 are adapted for connection to base and windshield contact members, not shown, in the same way as are the other embodiments.

The motor 56 includes a drive shaft 57 extending through it into threaded engagement through the bottoms of the inner tubes 53, 55, and into their interiors. The sections of drive shaft 27 extending from the motor 56 into the inner tubes 53 and 55 are oppositely threaded. That is, one section of the drive shaft 56 has right hand threads and one section has left hand threads. Rotation of the motor 56 in one direction expands the actuator 51. Motor rotation in the opposite direction retracts the actuator 51. Because the drive shaft extends in both directions from the motor, the device of FIG. 10 has a longer reach than the others describe above. This will be advantageous for work on larger vehicles or other work requiring longer reach. The double-acting nature of this device also enables it to expand and retract at double speed.

In all of the configurations described above, when the windshield jack is in place, rotation of the drive motor extends the actuator to push the windshield forward of the automobile body to open up the necessary work space.

The drive motor might be operable with standard shop voltage, or with 12 volts from an automotive electrical system, or it might be adaptable for operation with either. It is also advantageous for the worker to control the drive motor from a remote control, such as a hand held control. Another alternative is that, instead of electric, the drive motor might be air driven.

The foregoing description of a preferred embodiment of this invention, including any dimensions, angles, or proportions, is intended as illustrative. The concept and scope of the invention are limited only by the following claims and equivalents thereof.

What is claimed is:

1. A windshield jack for placement against a windshield of a vehicle to push the upper part of said windshield outward relative to the body of said vehicle, said jack including:

a linear actuator operable between retracted and extended conditions, said actuator including elongated inner and outer tubes axially movable relative to each other, a reversible drive motor connected to said outer tube, a threaded drive shaft extending from said motor into engagement with said inner tube;

a base member on one end of said actuator for engagement with an interior structure of said vehicle; and a windshield contact member on the other end of said actuator for engagement with said windshield;

wherein said base member is one selected from the group consisting of a resilient foot pad and a bowed crossbar, and said windshield contact member is one selected from the group consisting a suction cup and a crossbar with suction cups therealong:

whereby rotation of said motor in one direction is effective to move said inner tube to extend said actuator, and rotation of said motor in the opposite direction is effective to move said inner tube to retract said actuator.

2. A windshield jack for placement between an interior structure of a vehicle and the windshield of said vehicle to push the upper part of said windshield outward relative to the body of said vehicle, said jack including:

a linear actuator operable between retracted and extended conditions, said actuator including elongated inner and outer tubes axially movable relative to each other, a reversible drive motor connected to said outer tube, a threaded drive shaft extending from said motor into engagement with said inner tube;

a supporting base member removably and pivotally connected to one end of said actuator and adapted for engagement with an interior structure of said vehicle, said base member including a resilient foot pad; and a windshield contact member removably and pivotally connected to the other end of said actuator and adapted for engagement with said windshield, said windshield contact member including a suction cup;

whereby rotation of said motor and drive shaft in one direction is effective to move said inner tube to extend said actuator, and rotation of said motor and drive shaft in the opposite direction is effective to move said inner tube to retract said actuator.

3. A windshield jack for placement between an interior structure of a vehicle and the windshield of said vehicle to push the upper part of said windshield outward relative to the body of said vehicle, said jack including:

a linear actuator operable between retracted and extended conditions, said actuator including elongated inner and outer tubes axially movable relative to each other, a reversible drive motor connected to said outer tube, a threaded drive shaft extending from said motor into engagement with said inner tube;

a supporting base member removably and pivotally connected to one end of said actuator and adapted for engagement with an interior structure of said vehicle, said base member including a bowed crossbar to straddle a console between vehicle seats; and a windshield contact member removably and pivotally connected to the other end of said actuator and adapted for engagement with said windshield, said windshield contact member including a crossbar with suction cups along the length thereof;

whereby rotation of said motor and drive shaft in one direction is effective to move said inner tube to extend said actuator, and rotation of said motor and drive shaft in the opposite direction is effective to move said inner tube to retract said actuator.

* * * * *